US010524489B2

United States Patent
Stark

(10) Patent No.: US 10,524,489 B2
(45) Date of Patent: Jan. 7, 2020

(54) METHOD AND COMPOSITION TO CONTROL RUMEN RELEASE OF COBALT TO RUMEN BACTERIA FOR MAKING VITAMIN B12

(71) Applicant: Zinpro Corporation, Eden Prairie, MN (US)

(72) Inventor: Peter A. Stark, Inver Grove Heights, MN (US)

(73) Assignee: Zinpro Corporation, Eden Prairie, MN (US)

( * ) Notice: Subject to any disclaimer, the term of this patent is extended or adjusted under 35 U.S.C. 154(b) by 271 days.

(21) Appl. No.: 15/647,944

(22) Filed: Jul. 12, 2017

(65) Prior Publication Data

US 2019/0014797 A1    Jan. 17, 2019

(51) Int. Cl.
*A23K 20/20* (2016.01)
*A23K 50/10* (2016.01)

(52) U.S. Cl.
CPC .............. *A23K 20/30* (2016.05); *A23K 50/10* (2016.05)

(58) Field of Classification Search
CPC ... Y10S 426/807; A23K 20/163; A23K 20/13; A23K 50/10
USPC .................... 426/72, 74, 648, 615
See application file for complete search history.

(56) References Cited

U.S. PATENT DOCUMENTS 4,678,854 A    7/1987  Abdel-Monem
2013/0339216 A1*  12/2013  Lambert

FOREIGN PATENT DOCUMENTS

GB    866924 A    5/1961
WO    9111915 A1    8/1991

OTHER PUBLICATIONS

Girard, C.L., et al., "Effects of Intramuscular Injections of Vitamin B12 on Lactation Performance of Dairy Cows Fed Dietary Supplements of Folic Acid and Rumen-Protected Methionine", American Dairy Science Association, pp. 671-676, accepted Oct. 14, 2004.
Zinpro Corporation, PCT/US2018/039950 filed Jun. 28, 2018, "The International Search Report and the Written Opinion of the International Searching Authority, or the Declaration", dated Aug. 30, 2018.
Uchida et al., "Effect of feeding a combination of zinc, manganese and copper amino acid complexes, and cobalt glucoheptonate on perforamnce of early lactation high producing dairy cows", Animal Feed Science and Technology, vol. 93, pp. 193-203, 2001.
Ballantine et al., "Effects of Feeding Complexed Zinc, Manganese, Copper, and Cobalt to Late Gestation and Lactating Dairy Cows on Claw Integrity, Reproduction, and Lactation Performance", The Professional Animal Scientist, vol. 18, pp. 211-218, 2002.

(Continued)

*Primary Examiner* — Helen F Heggestad
(74) *Attorney, Agent, or Firm* — McKee, Voorhees & Sease, PLC

(57) ABSTRACT

A method and composition which is a unique source of cobalt for enhanced production of Vitamin $B_{12}$ in the rumen. It has the advantage of a slow release source of cobalt combined with a fast release source of cobalt. The fast cobalt ion release source which is a soluble source of cobalt is turned over faster in the rumen than the insoluble cobalt sources are turned over.

10 Claims, 3 Drawing Sheets

(56) References Cited

OTHER PUBLICATIONS

Pal et al., "Organic trace minerals for improving livestock production", Broadening Horizons No. 15, 14 pages, May 2015.
Suttle, N.F., "Mineral Nutrition of Livestock", Cobalt, Ch. 10, pp. 223-254, Jan. 1, 2010.
Valadez-Vega et al., "Lead, Cadmium and Cobalt (Pb, Cd, and Co) Leaching of Glass-Clay Containers by pH Effect of Food", Int. J. Mol. Sci., vol. 12, No. 4, pp. 2336-2350, Apr. 4, 2011.

* cited by examiner

METHOD AND COMPOSITION TO CONTROL RUMEN RELEASE OF COBALT TO RUMEN BACTERIA FOR MAKING VITAMIN B12

FIELD OF THE INVENTION

This invention relates to a cobalt mixture that is a new source of cobalt for domesticated ruminant animals. Taking advantage of a mixture of cobalt salts that are a combination of fast cobalt release and slow cobalt release in the rumen of ruminant animals the cobalt is available to the rumen bacteria of a ruminant animal over a steady period of time for the bacteria to produce Vitamin $B_{12}$ needed for the animal health and milk production during lactation.

BACKGROUND OF THE INVENTION

Vitamin $B_{12}$ is unique among the vitamins in that it contains not only an organic molecule, but also the essential trace element cobalt. Vitamin $B_{12}$ is not made by either plants or animals and can be synthesized by only a few species of microorganisms. Bacteria in the human intestinal tract can make enough Vitamin $B_{12}$ for normal daily requirements from inorganic cobalt salts in the diet. Vitamin $B_{12}$ is also made in large amounts by rich populations of bacteria in the rumen of ruminant animals and in the cecum of other herbivorous species.

Vitamin $B_{12}$ participates in many biochemical processes that are essential for life. It acts as a co-enzyme for several enzymes which catalyze the shift of a hydrogen atom from one carbon atom to an adjacent one in exchange for an alkyl, carboxyl, hydroxyl or amino groups. Deficiency of Vitamin $B_{12}$ results in the development of the serious disease pernicious anemia. Pernicious anemia, as the name implies, involves a low concentration of hemoglobin resulting from the condition, but the effects also include serious disturbances of the central nervous system that may result in abnormal sensations, motion, and in humans, thought.

Vitamin $B_{12}$ is known to have a positive effect on lactation performance of dairy cows, see for example the *Journal of Dairy Science*, 2005 February; 88(2): 671-6, Girard et al. which shows that in early lactation the supply of Vitamin $B_{12}$, if deficient, limits the lactation performance of cows. Since cobalt is needed in animal nutrition as a key component to Vitamin $B_{12}$ production it therefore follows that ruminants need adequate dietary supply of cobalt for effective animal nutrition and efficient lactation performance. In ruminants, the soluble portion of the ruminal material (solids and liquids) is turned over faster than the solids. This means that highly soluble sources of cobalt will remain in the rumen less time than insoluble forms. This invention relates to the ability of a ruminant's bacteria to produce Vitamin $B_{12}$. The need for increased $B_{12}$ production can be seen by the increased performance when $B_{12}$ is injected, see Journal Dairy Science article previously cited.

SUMMARY OF THE INVENTION

A method and composition which is a unique source of cobalt for enhanced production of Vitamin $B_{12}$ in the rumen. It has the advantage of a slow release source of cobalt combined with a fast release source of cobalt. The fast cobalt ion release source which is a soluble source of cobalt is turned over faster in the rumen than the solids cobalt sources are turned over. Thus slower release, for example longer polymer strands of cobalt ligands, are digested over a longer period of time, giving slower release of the cobalt. In this way, a portion of the cobalt mixture is soluble and another portion substantially insoluble; the insoluble portion will remain in the rumen longer. As the bacteria consume, for example, a polysaccharide of cobalt, it will release the cobalt for $B_{12}$ production. Alternatively, non-rumen degradable polymers like polyacrylic acid would just slowly release cobalt. Surprisingly such control or slow release of cobalt to the rumen bacteria in combination with a faster release such as a soluble salt of cobalt source like a monomeric sugar, is shown by data to have greater $B_{12}$ production than an all soluble cobalt source, or an all insoluble source.

DETAILED DESCRIPTION OF THE PREFERRED EMBODIMENTS

Figure 1:
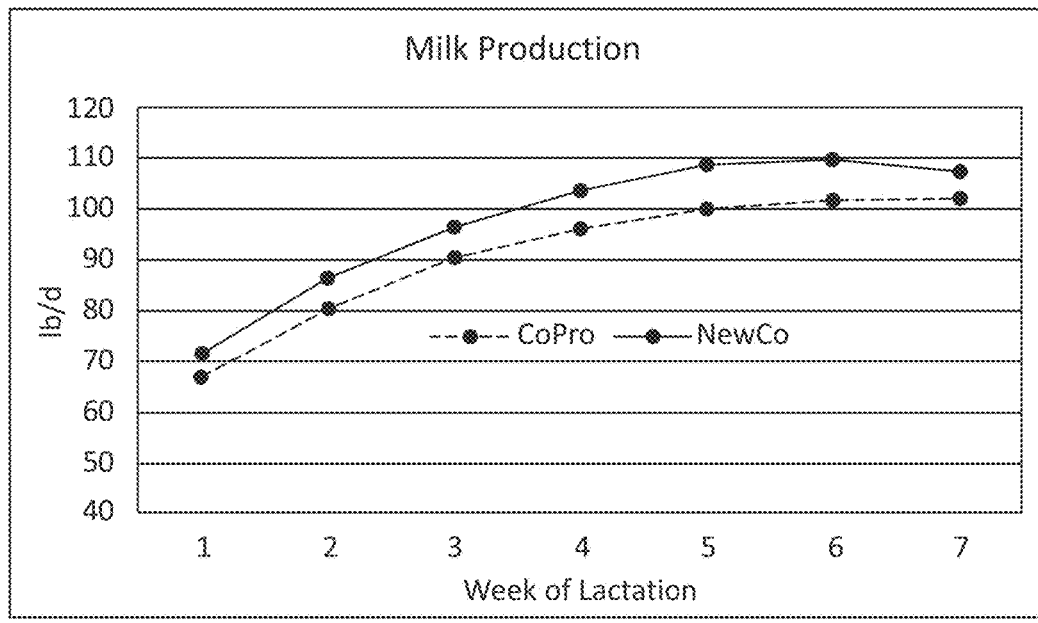
FIG. 1 is a graph comparing milk production where the only difference in the animal feed is the cobalt source.

This invention involves a mixture of a quick release cobalt source and a slow release cobalt source, which when fed to a ruminant animal, allows some cobalt ions (the quick release) to immediately be used by the rumen bacteria in making Vitamin $B_{12}$, with the balance to slowly release additional cobalt ions as it is more slowly metabolized by the microorganisms of the rumen. Studies have surprisingly demonstrated this combination of quick release and slow release cobalt sources results in more efficient and effective production of Vitamin $B_{12}$ than either source alone. Not wishing to be bound by any theory, it is believed this occurs because the quick release passes through the rumen faster than the bacteria can metabolize it to Vitamin $B_{12}$ thus much of it "wasted". In contrast the slow release source of cobalt occurs as the rumen microorganisms gradually metabolize larger molecules of the more insoluble polymers releasing the cobalt to make Vitamin $B_{12}$. In the case of all slow release time is "wasted" with limited cobalt available to result in less $B_{12}$.

Quick release sources of cobalt include soluble inorganic and organic sources of cobalt such as cobalt chloride, cobalt sulfate, cobalt acetate and other fast release (soluble) cobalt monomer sugar complexes like for example cobalt glucoheptonate or cobalt gluconate, as shown in the assignees earlier U.S. Pat. No. 4,678,854, of Jul. 7, 1987, the disclosure of which is incorporated herein by reference.

Slow release cobalt sources include insoluble and partially soluble cobalt polymer ligands such as those of alginic acid, pectin, polyacrylic and carboxymethycellulose complexes with cobalt, as well as other cobalt inclusive polymer complexes with pendant carboxylic acid groups, all of which are largely insoluble.

The quick release cobalt source allows the cobalt to immediately be available to the bacteria from the liquid in the rumen, although much of it passes through so quickly that it cannot all be used. The slow release cobalt source remains in the rumen and passes through only when the microorganisms metabolize the polymer or the salt slowly releases the cobalt which results in a gradually available cobalt source for the making of Vitamin $B_{12}$ or a gradual release of cobalt from the insoluble form.

The key is to have some polymer bound soluble cobalt and some portion of that being insoluble. This creates a situation where the soluble fraction can immediately start being utilized by the bacteria. As the fluid is turned over in the rumen the cobalt available to the bacteria in an all soluble (inorganic or low molecular weight ligands) will be removed from the rumen. By this time the bacteria will have been degrading the polymer from the polymer bound cobalt releasing this cobalt fraction to the rumen fluid. In essence this "insoluble" fraction is a controlled release source of cobalt. Surprisingly it is best to have both types of cobalt present to optimize vitamin B12 production. The polymer bound insoluble portion can be derived from any acid containing polymer. The prime examples are pectin and alginic acid.

The examples set forth below are offered as illustrative of embodiments of the invention with the understanding that they are not limiting as other examples could as well be set forth. It is believed, however, they are representative of the invention and data produced by use of the invention.

EXAMPLE 1

Cobalt Pectin—2 eq. Cobalt, 10 eq. NaOH, 12 hours at 20° C.

To 750 mL of dI water is added sodium hydroxide (59.92 g, 1.49 mols). To this alkaline solution pectin (30.01 g, 0.169 mols of carboxylic acid subunits) is added slowly so as to disperse finely upon the surface of the solution. The fine dispersion quickly becomes a dark orange suspension which is allowed to stir for 12 hours at 20° C. The pH is adjusted to 8.8 with 12M HCl acid at this point solid $CoCl_2$ $6H_2O$ (80.42 g, 0.338 mols) is added to the reaction in one portion. The resulting pink suspension is stirred for an additional 1 hour and then dried at 88° C. for 12 hours. The final blue powder is homogenized and analyzed for cobalt levels.

FIG. 1 compares the milk production where the only difference in the animal feed is the cobalt source. The CoPro source is cobalt glucoheptonate. This is a soluble monomer sugar ligand to the cobalt. When we used an example of the new cobalt source being 75% cobalt chloride and 25% cobalt pectin an increase in milk production was noted.

TABLE 1

| Item | CoPro | Invention Cobalt | SE of Mean difference | P-value |
|---|---|---|---|---|
| Milk, lb/d | 89.9 | 97.0 | 3.0 | 0.02 |

This milk production increase was statistically significant.

EXAMPLE 2

Cobalt Pectin—1 eq. Cobalt, 10 eq. NaOH, 12 hours at 20° C.

To 750 mL of dI water is added sodium hydroxide (60.02 g, 1.50 mols). To this alkaline solution pectin (30.05 g, 0.169 mols of carboxylic acid subunits) is added slowly so as to disperse finely upon the surface of the solution. The fine dispersion quickly becomes a dark orange suspension which is allowed to stir for 12 hours at 20° C. The pH is adjusted to 8.8 with 12M HCl acid at this point solid $CoCl_2$ $6H_2O$ (40.44 g, 0.170 mols) is added to the reaction in one portion. The resulting pink suspension is stirred for an additional 1 hour and then dried at 88° C. for 12 hours. The final blue powder is homogenized and analyzed for cobalt levels.

EXAMPLE 3

Cobalt Pectin—0.66 eq. Cobalt, 10 eq. NaOH, 12 hours at 20° C.

To 750 mL of dI water is added sodium hydroxide (60.09 g, 1.50 mols). To this alkaline solution pectin (30.03 g, 0.169 mols of carboxylic acid subunits) is added slowly so as to disperse finely upon the surface of the solution. The fine dispersion quickly becomes a dark orange suspension which is allowed to stir for 12 hours at 20° C. The pH is adjusted to 8.8 with 12M HCl acid at this point solid $CoCl_2$ $6H_2O$ (26.50 g, 0.112 mols) is added to the reaction in one portion. The resulting pink suspension is stirred for an additional 1 hour and then dried at 88° C. for 12 hours. The final blue powder is homogenized and analyzed for cobalt levels.

EXAMPLE 4

Cobalt Pectin—0.5 eq. Cobalt, 10 eq. NaOH, 12 hours at 20° C.

To 750 mL of dI water is added sodium hydroxide (59.96 g, 1.49 mols). To this alkaline solution pectin (29.99 g, 0.169 mols of carboxylic acid subunits) is added slowly so as to disperse finely upon the surface of the solution. The fine dispersion quickly becomes a dark orange suspension which is allowed to stir for 12 hours at 20° C. The pH is adjusted to 8.8 with 12M HCl acid at this point solid $CoCl_2$ $6H_2O$ (20.11 g, 0.085 mols) is added to the reaction in one portion. The resulting pink suspension is stirred for an additional 1 hour and then dried at 88° C. for 12 hours. The final blue powder is homogenized and analyzed for cobalt levels.

EXAMPLE 5

Cobalt Alginic—2 eq. Cobalt, 10 eq. NaOH, 12 hours at 20° C.

To 750 mL of dI water is added sodium hydroxide (60.01 g, 1.50 mols). To this alkaline solution alginic acid (29.90 g, 0.168 mols of carboxylic acid subunits) is added slowly so as to disperse finely upon the surface of the solution. The fine dispersion quickly becomes a dark yellow brown suspension which is allowed to stir for 12 hours at 20° C. The pH is adjusted to 8.8 with 12M HCl acid at this point solid $CoCl_2$ $6H_2O$ (80.41 g, 0.338 mols) is added to the reaction in one portion. The resulting pink suspension is stirred for an additional 1 hour and then dried at 88° C. for 12 hours. The final blue powder is homogenized and analyzed for cobalt levels.

EXAMPLE 6

Cobalt Alginic—1 eq. Cobalt, 10 eq. NaOH, 12 hours at 20° C.

To 750 mL of dI water is added sodium hydroxide (59.95 g, 1.49 mols). To this alkaline solution alginic acid (30.01 g, 0.169 mols of carboxylic acid subunits) is added slowly so as to disperse finely upon the surface of the solution. The fine dispersion quickly becomes a dark yellow brown suspension which is allowed to stir for 12 hours at 20° C. The pH is adjusted to 8.8 with 12M HCl acid at this point solid $CoCl_2$ $6H_2O$ (40.15 g, 0.168 mols) is added to the reaction in one portion. The resulting pink suspension is stirred for an additional 1 hour and then dried at 88° C. for 12 hours. The final blue powder is homogenized and analyzed for cobalt levels.

EXAMPLE 7

Cobalt Alginic—0.66 eq. Cobalt, 10 eq. NaOH, 12 hours at 20° C.

To 750 mL of dI water is added sodium hydroxide (59.99 g, 1.50 mols). To this alkaline solution alginic acid (29.98 g, 0.169 mols of carboxylic acid subunits) is added slowly so as to disperse finely upon the surface of the solution. The fine dispersion quickly becomes a dark yellow brown suspension which is allowed to stir for 12 hours at 20° C. The pH is adjusted to 8.8 with 12M HCl acid at this point solid $CoCl_2$ $6H_2O$ (26.53 g, 0.112 mols) is added to the reaction in one portion. The resulting pink suspension is stirred for an additional 1 hour and then dried at 88° C. for 12 hours. The final blue powder is homogenized and analyzed for cobalt levels.

EXAMPLE 8

Cobalt Alginic—0.5 eq. Cobalt, 10 eq. NaOH, 12 hours at 20° C.

To 750 mL of dI water is added sodium hydroxide (60.02 g, 1.50 mols). To this alkaline solution alginic acid (30.06 g, 0.169 mols of carboxylic acid subunits) is added slowly so as to disperse finely upon the surface of the solution. The fine dispersion quickly becomes a dark yellow brown suspension which is allowed to stir for 12 hours at 20° C. The pH is adjusted to 8.8 with 12M HCl acid at this point solid $CoCl_2$ $6H_2O$ (20.08 g, 0.085 mols) is added to the reaction in one portion. The resulting pink suspension is stirred for an additional 1 hour and then dried at 88° C. for 12 hours. The final blue powder is homogenized and analyzed for cobalt levels.

EXAMPLE 9

Cobalt Polyacrylic Acid—2 eq. Cobalt, 1 eq. NaOH

To 750 mL of dI water is added sodium hydroxide (2.04 g, 0.051 mols). To this alkaline solution 50% polyacrylic acid (7.57 g, 0.051 mols of carboxylic acid subunits) is added in one portion. The clear solution is allowed to stir for 10 minutes at which point $CoCl_2$ $6H_2O$ (24.28 g, 0.102 mols) is added in one portion. The pink suspension is stirred for an additional one hour at room temperature and then dried at 88° C. for 12 hours. The final blue powder is homogenized and analyzed for cobalt levels.

EXAMPLE 10

Cobalt Polyacrylic Acid—1 eq. Cobalt, 1 eq. NaOH

To 750 mL of dI water is added sodium hydroxide (2.10 g, 0.051 mols). To this alkaline solution 50% polyacrylic acid (7.54 g, 0.051 mols of carboxylic acid subunits) is added in one portion. The clear solution is allowed to stir for 10 minutes at which point $CoCl_2$ $6H_2O$ (12.14 g, 0.051 mols) is added in one portion. The pink suspension is stirred for an additional one hour at room temperature and then dried at 88° C. for 12 hours. The final blue powder is homogenized and analyzed for cobalt levels.

EXAMPLE 11

Cobalt Polyacrylic Acid—0.66 eq. Cobalt, 1 eq. NaOH

To 750 mL of dI water is added sodium hydroxide (2.04 g, 0.051 mols). To this alkaline solution 50% polyacrylic acid (7.60 g, 0.051 mols of carboxylic acid subunits) is added in one portion. The clear solution is allowed to stir for 10 minutes at which point $CoCl_2$ $6H_2O$ (8.00 g, 0.034 mols) is added in one portion. The pink suspension is stirred for an additional one hour at room temperature and then dried at 88° C. for 12 hours. The final blue powder is homogenized and analyzed for cobalt levels.

EXAMPLE 12

Cobalt Polyacrylic Acid—0.5 eq. Cobalt, 1 eq. NaOH

To 750 mL of dI water is added sodium hydroxide (2.01 g, 0.051 mols). To this alkaline solution 50% polyacrylic acid (7.57 g, 0.051 mols of carboxylic acid subunits) is added in one portion. The clear solution is allowed to stir for 10 minutes at which point $CoCl_2$ $6H_2O$ (6.08 g, 0.102 mols) is added in one portion. The pink suspension is stirred for an additional one hour at room temperature and then dried at 88° C. for 12 hours. The final blue powder is homogenized and analyzed for cobalt levels.

EXAMPLE 13

Cobalt Pectin 1 eq. Cobalt (50% Organic/50% Inorganic)—2.5 hours at 70° C.—1 eq. Base—No HCl To 370 mL of dI water is added sodium hydroxide (6.74 g, 0.168 mols). To this alkaline solution pectin (30.01 g, 0.169 mols of carboxylic acid subunits) is added slowly so as to disperse finely upon the surface of the solution. The fine dispersion quickly becomes a dark orange suspension which is allowed to stir for 2.5 hours at 70° C. At this point solid $CoCl_2$ $6H_2O$ (40.21 g, 0.169 mols) is added to the reaction in one portion and the pH of 12.31 is consequently reduced to 5.868. The resulting pink suspension is stirred for an additional 1 hour and then dried at 88° C. for 12 hours. The final blue powder is homogenized and analyzed for cobalt levels and molecular weight.

EXAMPLE 14

Cobalt Pectin—1 eq. Cobalt, 1 eq. NaOH, 2 hours at 70° C., HCl Quench

To 370 mL of dI water is added sodium hydroxide (6.79 g, 0.169 mols). To this alkaline solution pectin (40.49 g, 0.169 mols of carboxylic acid subunits) is added slowly so as to disperse finely upon the surface of the solution. The fine dispersion quickly becomes a dark orange suspension which is allowed to stir for 2 hours at 70° C. The pH is adjusted to 8.8 with 12M HCl (10.5 mL, 126 mmols) acid at this point solid $CoCl_2$ $6H_2O$ (40.08 g, 0.170 mols) is added to the reaction in one portion. The resulting pink suspension is stirred for an additional 1 hour and then dried at 88° C. for 12 hours. The final blue powder is homogenized and analyzed for cobalt levels.

EXAMPLE 15

Cobalt Pectin—0.66 eq. Cobalt, 1 eq. NaOH, 2 hours at 70° C., No HCl Quench

To 370 mL of dI water is added sodium hydroxide (6.70 g, 0.168 mols). To this alkaline solution pectin (40.45 g, 0.169 mols of carboxylic acid subunits) is added slowly so as to disperse finely upon the surface of the solution. The fine dispersion quickly becomes a dark orange suspension which is allowed to stir for 2 hours at 70° C. At this point solid $CoCl_2$ $6H_2O$ (26.40 g, 0.112 mols) is added to the reaction in one portion and the pH of 12.45 is consequently reduced to 5.938. The resulting pink suspension is stirred for an additional 1 hour and then dried at 88° C. for 12 hours. The final blue powder is homogenized and analyzed for cobalt levels and molecular weight.

EXAMPLE 16

Cobalt Pectin—0.5 eq. Cobalt, 1 eq. NaOH, 2 hours at 70° C., No HCl Quench

To 370 mL of dI water is added sodium hydroxide (6.81 g, 0.169 mols). To this alkaline solution pectin (40.53 g, 0.169 mols of carboxylic acid subunits) is added slowly so as to disperse finely upon the surface of the solution. The fine dispersion quickly becomes a dark orange suspension which is allowed to stir for 2 hours at 70° C. At this point solid $CoCl_2$ $6H_2O$ (20.07 g, 0.085 mols) is added to the reaction in one portion and the pH of 12.40 is consequently reduced to 5.871. The resulting pink suspension is stirred for an additional 1 hour and then dried at 88° C. for 12 hours. The final blue powder is homogenized and analyzed for cobalt levels and molecular weight.

EXAMPLE 17

Cobalt Pectin—1 eq. Cobalt, 2 eq. NaOH, 2 hours at 70° C., HCl Quench

To 370 mL of dI water is added sodium hydroxide (13.51 g, 0.338 mols). To this alkaline solution pectin (40.46 g, 0.169 mols of carboxylic acid subunits) is added slowly so as to disperse finely upon the surface of the solution. The fine dispersion quickly becomes a dark orange suspension which is allowed to stir for 2 hours at 70° C. The pH is adjusted to 8.8 with 12M HCl (21.5 mL, 258 mmols) acid at this point solid $CoCl_2$ $6H_2O$ (39.91 g, 0.169 mols) is added to the reaction in one portion. The resulting pink suspension is stirred for an additional 1 hour and then dried at 88° C. for 12 hours. The final blue powder is homogenized and analyzed for cobalt levels.

EXAMPLE 18

Cobalt Pectin—1 eq. Cobalt, 4 eq. NaOH, 2 hours at 70° C., HCl Quench

To 370 mL of dI water is added sodium hydroxide (27.01 g, 0.68 mols). To this alkaline solution pectin (40.54 g, 0.169 mols of carboxylic acid subunits) is added slowly so as to disperse finely upon the surface of the solution. The fine dispersion quickly becomes a dark orange suspension which is allowed to stir for 2 hours at 70° C. The pH is adjusted to 8.8 with 12M HCl (43 mL, 516 mmols) acid at this point solid $CoCl_2$ $6H_2O$ (39.91 g, 0.169 mols) is added to the reaction in one portion. The resulting pink suspension is stirred for an additional 1 hour and then dried at 88° C. for 12 hours. The final blue powder is homogenized and analyzed for cobalt levels.

EXAMPLE 19

Cobalt Pectin—1.5 eq. Cobalt, 1 eq. NaOH, 2 hours at 70° C., HCl Quench

To 370 mL of dI water is added sodium hydroxide (6.74 g, 0.168 mols). To this alkaline solution pectin (40.48 g, 0.169 mols of carboxylic acid subunits) is added slowly so as to disperse finely upon the surface of the solution. The fine dispersion quickly becomes a dark orange suspension which is allowed to stir for 2 hours at 70° C. The pH is adjusted to 8.8 with 12M HCl (10.8 mL, 130 mmols) acid at this point solid $CoCl_2$ $6H_2O$ (60.03 g, 0.26 mols) is added to the reaction in one portion. The resulting pink suspension is stirred for an additional 1 hour and then dried at 88° C. for 12 hours. The final blue powder is homogenized and analyzed for cobalt levels.

EXAMPLE 20

Cobalt Pectin—1 eq. Cobalt, 1 eq. NaOH, 2 hours at 20° C., HCl Quench

To 370 mL of dI water is added sodium hydroxide (6.81 g, 0.169 mols). To this alkaline solution pectin (40.5 g, 0.169 mols of carboxylic acid subunits) is added slowly so as to disperse finely upon the surface of the solution. The fine dispersion quickly becomes a dark orange suspension which is allowed to stir for 2 hours at 20° C. The pH is adjusted to 8.8 with 12M HCl (10.5 mL, 126 mmols) acid at this point solid $CoCl_2$ $6H_2O$ (40.08 g, 0.170 mols) is added to the reaction in one portion. The resulting pink suspension is stirred for an additional 1 hour and then dried at 88° C. for 12 hours. The final blue powder is homogenized and analyzed for cobalt levels.

EXAMPLE 21

Figure 2:
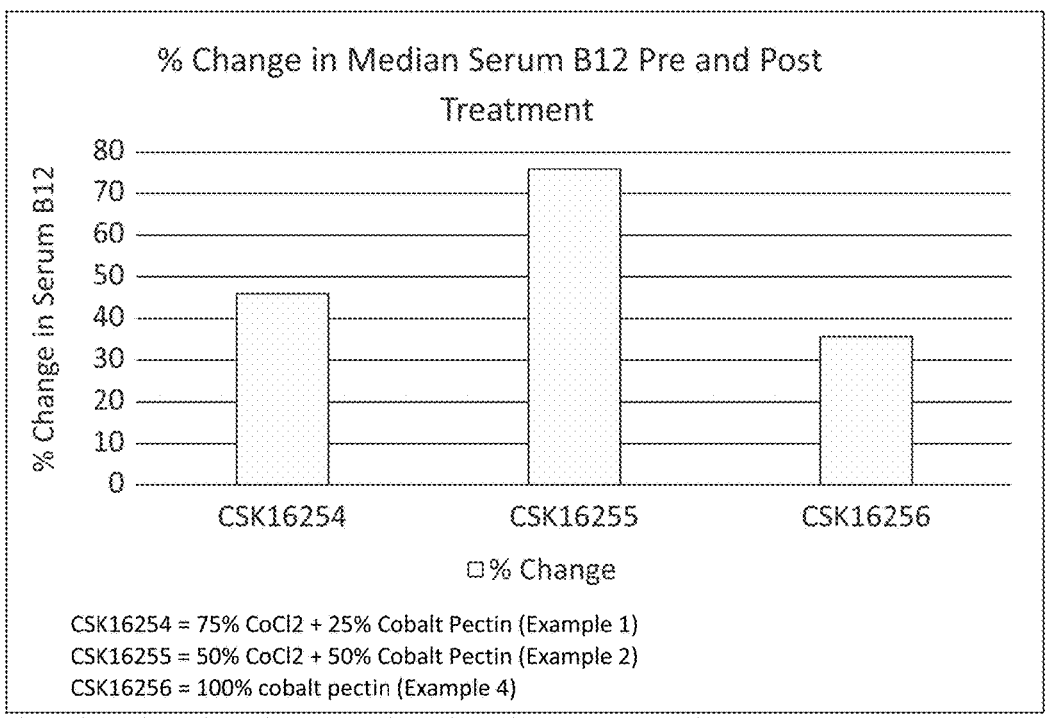
FIG. 2 examines the serum $B_{12}$ status of sheep after use of the invention for preparations of examples 1, 2 and 4.

The pre and post treatment data after receiving the given cobalt source by sheep is shown in FIG. 2. In FIG. 2 three cobalt sources were studied. CSK16254 was 75% $CoCl_2$ and 25% cobalt pectin (Example 1), CSK16255 was 50% $CoCl_2$ and 50% cobalt pectin (Example 2), CSK16256 was 100% cobalt pectin (Example 4). This study demonstrates that having a combination of soluble and monomeric ligand with a polymer bound cobalt source is advantageous over only the cobalt polymer bound form.

EXAMPLE 22

Figure 3:
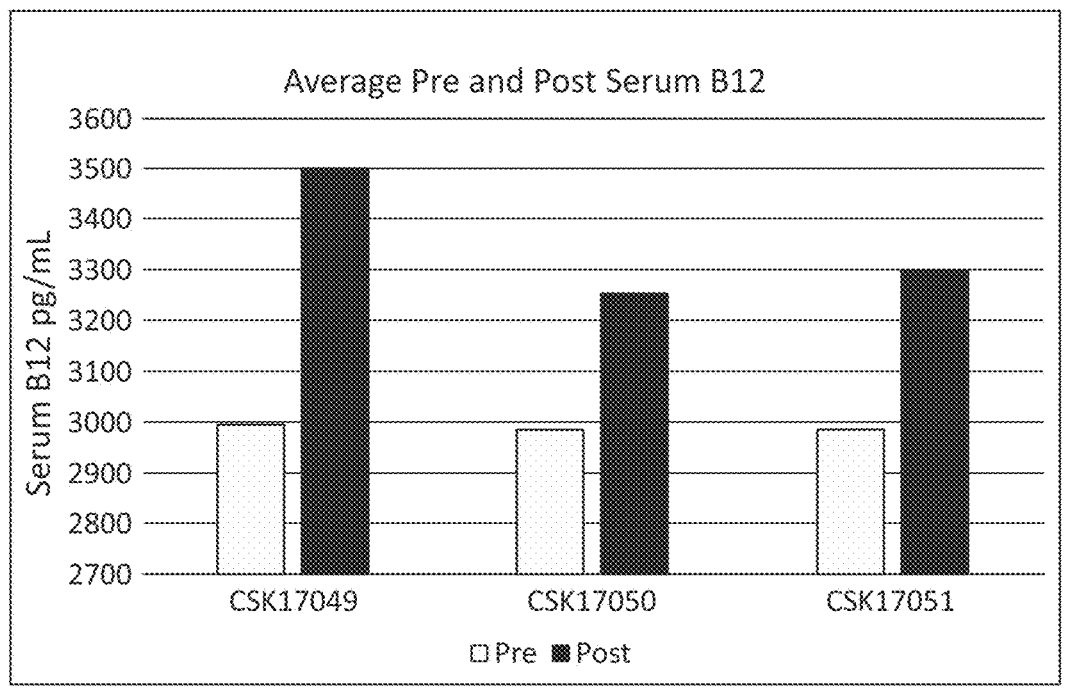
FIG. 3 shows pre- and post-treatment serum $B_{12}$ levels for preparations of examples 4 and 8.

FIG. 3 and the data shown reflect the change in $B_{12}$ levels in sheep. The pretreatment is before the addition of the cobalt treatments and the post is after the cobalt treatments. CSK17049 is 25% cobalt glucoheptonate and 75% cobalt pectin from example 4, CSK17050 is 25% cobalt chloride and 75% cobalt pectin from example 4, and CSK17051 is 25% cobalt chloride and 75% cobalt alginic acid from example 8. The data demonstrates that all of these combinations give a strong increase of vitamin $B_{12}$ in the sheep.

EXAMPLE 23

Figure 4:
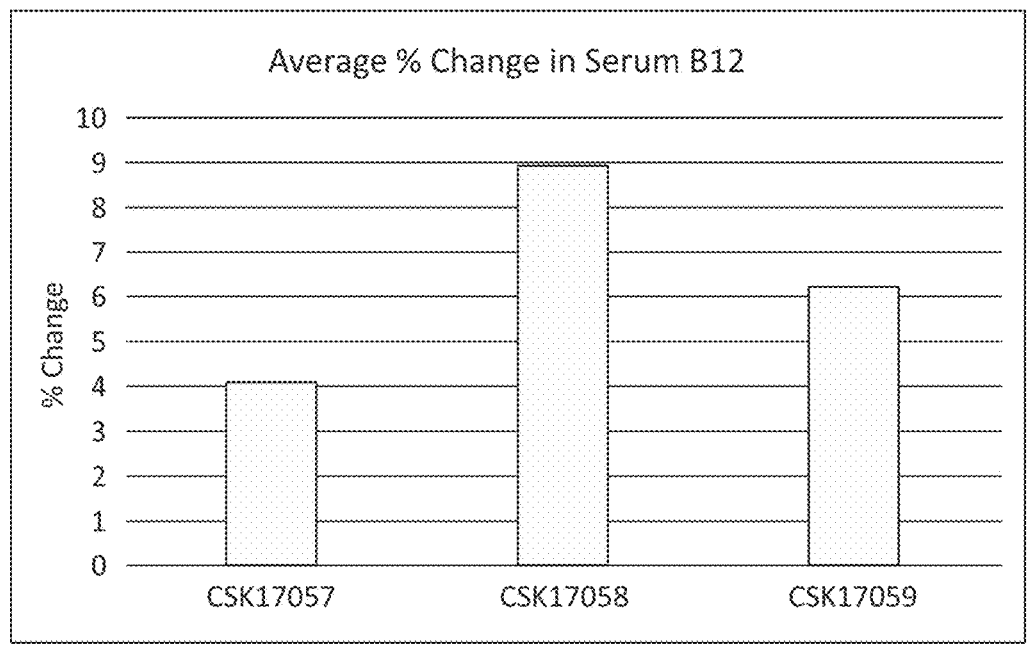
FIG. 4 shows pre- and post-treatment serum $B_{12}$ levels for formulations of examples 13, 2 and 15.

FIG. 4 and the data shown reflect the average change in $B_{12}$ levels from pre and post cobalt treatments in sheep. The pretreatment is before the addition of the cobalt treatments and the post is after the cobalt treatments. CSK17057 is 50% cobalt chloride and 50% cobalt pectin from example 13, CSK17058 is 50% cobalt chloride and 50% cobalt pectin from example 2, and CSK17059 is 25% cobalt chloride and 75% cobalt pectin from example 15. The data demonstrates that all of these combinations give a strong increase of Vitamin $B_{12}$ in the sheep.

EXAMPLE 24

Figure 5:
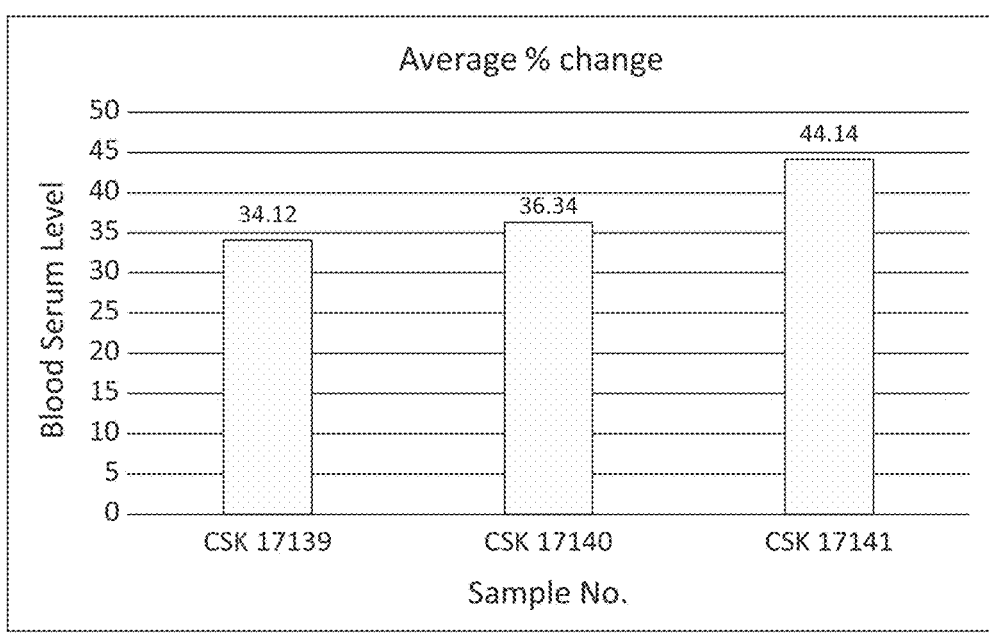
FIG. 5 shows pre- and post-treatment blood serum $B_{12}$ for formulations of examples 7, 9 and 10.

FIG. 5 and the data shown reflects the average change in B12 levels from pre and post cobalt treatment in sheep. The pretreatment is before the addition of the cobalt treatments and the post is after the treatment. CSK17139 is 75% cobalt chloride and 25% cobalt polyacrylic acid from example 9. CSK17140 is 50% cobalt chloride and 50% cobalt polyacrylic acid from example 10. CSK17141 is 25% cobalt chloride and 75% cobalt alginic acid from example 7. The data demonstrates that all of these combinations give a strong increase of Vitamin B12 in the sheep.

As earlier explained Examples 1-24 are illustrative only. They are offered to provide support for the attached claims. Applicant intends to rely upon the doctrine of equivalents for proper scope. It is understood that other cobalt sources which provide quick release and slow release in combination when fed to ruminants are contemplated as long as they allow performance of the invention to enhance Vitamin $B_{12}$ production in ruminants especially during lactation.

What is claimed is:

1. A method of controlling rumen release of cobalt to rumen bacteria for conversion to Vitamin $B_{12}$, comprising:
   feeding to a ruminant animal a mixed cobalt source of:
   a quick release source of cobalt and a slow release source of cobalt;
   said slow release cobalt source being a polymer complex that includes a pendant carboxylic acid group selected from the group consisting of alginic acid, cobalt alginate, pectin, polyacrylic acid, and carboxymethyl cellulose;
   said quick release source of cobalt being from about 25% by weight to about 75% by weight of the total cobalt source with the balance of the total cobalt source being slow release cobalt source.

2. The method of claim 1 wherein the mixed cobalt source is about 50% by weight quick release cobalt source and about 50% by weight slow release cobalt source.

3. The method of claim 1 wherein the quick release cobalt source is selected from the group comprising soluble inorganic or organic sources of cobalt ions and soluble cobalt monomer sugar complexes.

4. The method of claim 1 wherein the slow release cobalt source is cobalt pectin.

5. The method of claim 1 wherein the cobalt source is selected from cobalt alginic acid or cobalt alginate.

6. A mixed cobalt source composition for feeding to ruminants to control rumen release rate of cobalt for conversion by rumen bacteria to Vitamin $B_{12}$ comprising:
   a quick release source of cobalt and a slow release source of cobalt;
   said slow release cobalt source being a polymer complex that includes a pendant carboxylic acid group selected from the group consisting of alginic acid, cobalt alginate, pectin, polyacrylic acid, and carboxymethyl cellulose;
   said quick release source of cobalt being from about 25% by weight to about 75% by weight of the total cobalt source with the balance of the total cobalt source being slow release cobalt source.

7. The composition of claim 6 wherein the mixed cobalt source is about 50% by weight quick release cobalt source and about 50% by weight slow release cobalt source.

8. The composition of claim 6 wherein the quick release cobalt source is selected from the group comprising soluble inorganic or organic sources of cobalt ions and soluble cobalt monomer sugar complexes.

9. The composition of claim 6 wherein the slow release cobalt source is cobalt pectin.

10. The composition of claim 6 wherein the cobalt source is cobalt alginic acid.

* * * * *